United States Patent
Caron et al.

(10) Patent No.: US 7,222,513 B2
(45) Date of Patent: May 29, 2007

(54) METHOD OF COMPENSATING ANISOTROPY IN A VIBRATING-BELL INERTIAL ROTATION SENSOR

(75) Inventors: Jean-Michel Caron, Saint-Gratien (FR); Vincent Ragot, Asnieres (FR); Alain Renault, Pontoise (FR); Alain Jeanroy, Conflans Sainte-Honorine (FR)

(73) Assignee: Sagem SA, Paris (FR)

( * ) Notice: Subject to any disclaimer, the term of this patent is extended or adjusted under 35 U.S.C. 154(b) by 244 days.

(21) Appl. No.: 11/007,168

(22) Filed: Dec. 9, 2004

(65) Prior Publication Data

US 2005/0126257 A1   Jun. 16, 2005

(30) Foreign Application Priority Data

Dec. 11, 2003   (FR) .................................. 03 14514

(51) Int. Cl.
  *G01C 17/38*   (2006.01)
(52) U.S. Cl. ..................................................... 73/1.77
(58) Field of Classification Search ................. 73/1.37, 73/1.38, 1.75, 1.77, 1.78, 1.82, 504.13
  See application file for complete search history.

(56) References Cited

U.S. PATENT DOCUMENTS

| 4,157,041 A | * | 6/1979 | Loper et al. ............. 73/504.13 |
| 4,951,508 A | * | 8/1990 | Loper et al. ............. 73/504.13 |
| 5,712,427 A | * | 1/1998 | Matthews ................ 73/504.04 |
| 5,892,152 A | * | 4/1999 | Darling et al. ........... 73/504.13 |
| 5,983,719 A | * | 11/1999 | Matthews et al. ....... 73/504.13 |

FOREIGN PATENT DOCUMENTS

| FR | 2 784 180 A1 | 4/2000 |
| FR | 2 821 422 A1 | 8/2002 |

* cited by examiner

*Primary Examiner*—Robert Raevis
(74) *Attorney, Agent, or Firm*—Birch, Stewart, Kolasch & Birch, LLP

(57) ABSTRACT

The method serves to compensates anisotropy in an inertial rotation sensor comprising a metallized vibrating bell (1) having a bias voltage applied thereto, the vibrating bell (1) having an edge (7) electrodes (5.1, 5.2), and the method comprises the steps of measuring, preferably by multiplexing, the anisotropy between the electrodes and of applying to the electrodes a fraction of the bias voltage that depends on the differences measured between the electrodes.

4 Claims, 1 Drawing Sheet

METHOD OF COMPENSATING ANISOTROPY IN A VIBRATING-BELL INERTIAL ROTATION SENSOR

The present invention relates to a method of compensating anisotropy in a vibrating-bell inertial rotation sensor.

BACKGROUND OF THE INVENTION

Inertial rotation sensors are known that comprise a vibrating bell, generally a hemispherical bell, having its surface metallized to receive a bias voltage, the bell having an edge facing electrodes that are carried by a stand. The electrodes are subdivided into control electrodes and detection electrodes. Control signals are applied to the control electrodes so as to cause the vibrating bell to vibrate, thereby deforming the bell with deformations of orientation that is sensitive to rotation of the sensor. The detection electrodes serve to measure the orientation of bell deformations and, by suitable processing, to deduce therefrom the rotary movements of the sensor. The displacements of the resonator relative to the electrode-carrier stand at two ends of a diameter are equal in modulus and in sign when they result from control signals for sustaining vibration, and they are equal in modulus but opposite in sign when they result from parasitic displacements of the bell, in particular bending of the axis of the bell. Summing the measurements taken on a given diameter serves to eliminate the parasitic displacements providing the detection gains are equal.

It is also known that the gain for each electrode is a function firstly of the area of the electrode and secondly of the size of the airgap between the electrode and the facing edge of the vibrating bell. In spite of very strict manufacturing tolerances, different electrodes have different areas or different airgaps leading to differences in gain between the electrodes, and this applies regardless of whether the electrodes are control electrodes or detection electrodes. In addition, in existing systems, each electrode is connected to a processing system and the various processing systems may also present gain differences between one another. As a result, in general, anisotropy exists both for control and for detection. This anisotropy is a source of error when calculating the rotary movements of the sensor.

OBJECT OF THE INVENTION

An object of the invention is to propose a method enabling the consequences of anisotropy in a vibrating bell inertial rotation sensor to be minimized.

BRIEF DESCRIPTION OF THE INVENTION

In order to achieve this object, the invention provides a method of compensating anisotropy in an inertial rotation sensor comprising a metallized vibrating bell having a bias voltage applied thereto, the vibrating bell having an edge facing control electrodes and detection electrodes carried by a stand, the method comprising the steps of measuring at least one component of the anisotropy between the detection electrodes, and applying a fraction of the bias voltage to said electrodes as a function of the differences measured between the electrodes.

Thus, by applying a fraction of the bias voltage to certain electrodes, the gain of those electrodes is modified, thus making it possible to balance the gain between the electrodes concerned, and thereby eliminate the calculation errors that result from gain differences.

In an advantageous version of the invention, the anisotropy is measured by measuring a gain difference between the electrodes. Thus, by means of a single measurement, all of the irregularities that result from the various gain components (airgap, electrode area, . . . ) are compensated.

In a preferred implementation of the invention, the gain difference between the electrodes is measured by multiplexing by means of a single processor system for a group of electrodes. Thus, for this group of electrodes, not only are errors stemming from structural anisotropy of the sensor eliminated, but the component of anisotropy that comes from the processing unit signal is also eliminated.

BRIEF DESCRIPTION OF THE DRAWING

Other characteristics and advantages of the invention will appear on reading the following description of particular, non-limiting implementations of the invention given with reference to the sole accompanying FIGURE which is a diagram showing the processor circuit of the invention associated with a sensor that is shown in section on an axial plane.

DETAILED DESCRIPTION OF THE INVENTION

Figure 1:
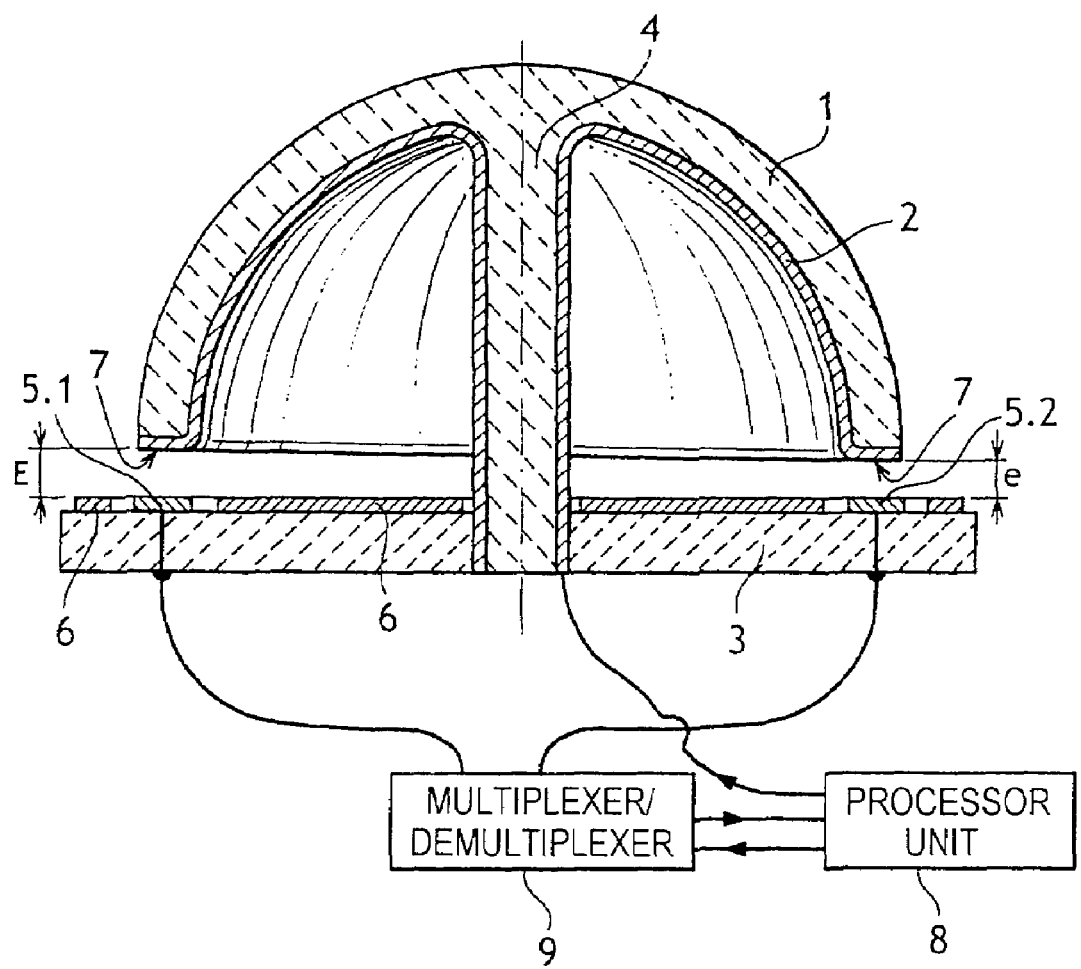

With reference to the FIGURE, the compensation method of the invention is applied to an inertial rotation sensor comprising in conventional manner a vibrating bell 1, in this case a hemispherical bell made of silica and secured by a stalk 4 to a stand 3. The inside surface of the bell 1 and the end face of the edge of the bell and the stalk 4 are covered in a layer of metal 2 which is connected to a processor unit 8 in order to receive a direct current (DC) bias voltage. The stand 3 carries a guard electrode 6 and control and detection electrodes, generally eight in total, extending facing the edge 7 of the bell 1 and regularly distributed around the axis of the bell 1. The FIGURE shows only two electrodes 5.1 and 5.2 that are diametrically opposite. These electrodes may equally well be control electrodes or detection electrodes. In the FIGURE, the distance between the electrodes and the edge 7 of the bell has deliberately been exaggerated in order to show more clearly the difference in size between the airgap E between electrode 5.1 and the edge 7 of the bell in comparison with the airgap e between the electrode 5.2 and the edge 7 of the bell.

In a preferred implementation of the invention, the electrodes are connected to a multiplexer/demultiplexer 9, itself connected to a processor unit 8.

In a first implementation of the method of the invention, the processor unit serves firstly via the multiplexer/demultiplexer 9 to measure the gain for each of the electrodes and to determine which electrode corresponds to the lowest gain and which electrode corresponds to the highest gain. A calculation is then performed in the processor unit 8 in order to determine is the fraction of the bias voltage which needs to be applied to the highest-gain electrode in order to bring its gain down to the value of the lowest-gain electrode. For each of the other electrodes, a similar calculation is performed in order to determine, starting from the fraction of the bias voltage that is applied to the highest-gain electrode, a bias voltage fraction of the same size and of magnitude that varies inversely with gain difference relative to the electrode with the lowest gain, so that all of the electrodes are thus caused to have the same gain.

In another implementation of the invention, it is also possible to compare the gain between two diametrically-opposite electrodes and to apply bias voltage fractions to said electrodes having the same magnitudes and opposite signs so that the gain is thus balanced for each pair of diametrically-opposite electrodes independently of gain corrections on the adjacent pairs.

Naturally, the invention is not limited to the implementation described and variant implementations can be devised without going beyond the ambit of the invention as defined by the claims.

In particular, although the invention is described for a single processor unit, the method of the invention can be implemented with conventional processor systems comprising a processing subsystem associated with each electrode. Under such circumstances, gain can be measured simultaneously for each electrode and the measured gains can be compared by the various processing subsystems in order to determine the bias voltage fractions to be applied to each of the electrodes, thus making it possible to correct the errors due to structural anisotropy of the sensor.

Although the invention is described with reference to a sensor having electrodes that face the end edge of the bell, the method of the invention can also be applied to a sensor in which the electrodes face the side face of the bell, around its edge.

It should also be observed that the method of the invention may be applied either in the workshop, merely by storing the bias voltage fractions to be applied to each electrode in a memory in the control unit of the sensor, or else it can be incorporated in the control unit of the sensor for implementation when the sensor is initialized prior to being used. When the invention is implemented in the workshop, a simplified correction can be applied by measuring only one of the components of the anisotropy, for example the differences between the airgaps, by using mechanical or optical means, and providing compensation for this component of the anisotropy only.

Although the invention is described with a single processing system providing gain compensation for all of the electrodes, it is also possible to apply compensation to the detection electrodes only or to apply compensation to the detection electrodes via a first processing subsystem associated with the detection electrodes and separate compensation to the control electrodes by means of a second processing subsystem associated with the control electrodes.

What is claimed is:

1. A method of compensating an electrode gain anisotropy in an inertial rotation sensor comprising a metallized vibrating bell (1) having a bias voltage applied thereto, the vibrating bell having an edge (7) facing control electrodes and detection electrodes (5.1, 5.2) carried by a stand (3), the method comprising the steps of measuring a gain difference between said detection electrodes, and applying a fraction of the bias voltage to at least one of said detection electrodes as a function of the gain differences measured between said detection electrodes for compensating said gain difference.

2. A method according to claim 1, including the steps of measuring the gains of all of the electrodes, applying to an electrode having the highest gain a bias voltage fraction necessary for balancing its gain with the electrode having the lowest gain, and applying to the other electrodes respective bias voltage fractions of the same sign and of magnitudes that vary inversely with their gain differences relative to the electrode having the lowest gain.

3. A method according to claim 1, including the steps of comparing gain between electrodes (5.1, 5.2) that are diametrically-opposite, and applying to said electrodes bias voltage fractions of the same magnitude and of opposite signs.

4. A method according to claim 1, wherein the gain difference between said detection electrodes is measured by multiplexing by means of a single processor system for a group of electrodes.

* * * * *